(12) United States Patent
Hsu

(10) Patent No.: US 10,390,045 B2
(45) Date of Patent: Aug. 20, 2019

(54) METHOD AND APPARATUS OF ALTERNATIVE TRANSFORM FOR VIDEO CODING

(71) Applicant: MEDIATEK INC., Hsin-Chu (TW)

(72) Inventor: Chih-Wei Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 127 days.

(21) Appl. No.: 15/525,369

(22) PCT Filed: Nov. 26, 2015

(86) PCT No.: PCT/CN2015/095645
§ 371 (c)(1),
(2) Date: May 9, 2017

(87) PCT Pub. No.: WO2016/082774
PCT Pub. Date: Jun. 2, 2016

(65) Prior Publication Data
US 2017/0366824 A1     Dec. 21, 2017

Related U.S. Application Data

(60) Provisional application No. 62/085,358, filed on Nov. 28, 2014.

(51) Int. Cl.
*H04N 19/12* (2014.01)
*H04N 19/18* (2014.01)
*H04N 19/46* (2014.01)
*H04N 19/61* (2014.01)
(Continued)

(52) U.S. Cl.
CPC ............. *H04N 19/61* (2014.11); *H04N 19/12* (2014.11); *H04N 19/122* (2014.11);
(Continued)

(58) Field of Classification Search
CPC ...... H04N 19/86; H04N 19/176; H04N 19/61; H04N 9/70; H04N 19/159
See application file for complete search history.

(56) References Cited

U.S. PATENT DOCUMENTS

| 8,259,808 | B2 | 9/2012 | Lin et al. |
| 8,631,060 | B2 | 1/2014 | Reznik et al. |

(Continued)

FOREIGN PATENT DOCUMENTS

| CN | 101896966 A | 11/2010 |
| CN | 102202218 A | 9/2011 |

(Continued)

OTHER PUBLICATIONS

International Search Report dated Mar. 2, 2016, issued in application No. PCT/CN2015/095645.
(Continued)

*Primary Examiner* — Tracy Y. Li
(74) *Attorney, Agent, or Firm* — McClure, Qualey & Rodack, LLP

(57) ABSTRACT

A method and apparatus for alternative transforms in a video coding system according to a control flag are disclosed. In one embodiment, the control flag for the current PU is determined. If the control flag is on, a first transform is applied to each current TU (transform unit) at an encoder side or an inverse transform of the first transform is applied to each current TU at a decoder side if the current TU has a first boundary type. Furthermore, a second transform is used for each current TU if the current TU has a second boundary type. The first transform is different from the second transform. On the other hand, if the control flag is off, a selected transform is used for each current TU.

18 Claims, 2 Drawing Sheets

(51) Int. Cl.
*H04N 19/70* (2014.01)
*H04N 19/122* (2014.01)
*H04N 19/157* (2014.01)
*H04N 19/159* (2014.01)
*H04N 19/176* (2014.01)
*H04N 19/625* (2014.01)

(52) U.S. Cl.
CPC ......... *H04N 19/157* (2014.11); *H04N 19/159* (2014.11); *H04N 19/176* (2014.11); *H04N 19/18* (2014.11); *H04N 19/46* (2014.11); *H04N 19/625* (2014.11); *H04N 19/70* (2014.11)

(56) References Cited

U.S. PATENT DOCUMENTS

| | | | |
|---|---|---|---|
| 9,832,461 | B2 | 11/2017 | Guo et al. |
| 2010/0177819 | A1 | 7/2010 | Jeon et al. |
| 2013/0003828 | A1 | 1/2013 | Cohen et al. |
| 2013/0003839 | A1* | 1/2013 | Gao ............... H04N 19/50 375/240.12 |
| 2013/0101048 | A1 | 4/2013 | Lee et al. |
| 2013/0114730 | A1 | 5/2013 | Joshi et al. |
| 2014/0056361 | A1 | 2/2014 | Karczewicz et al. |
| 2014/0140393 | A1 | 5/2014 | Seregin et al. |
| 2014/0219363 | A1 | 8/2014 | Seregin et al. |
| 2014/0376611 | A1* | 12/2014 | Kim ............... H04N 19/176 375/240.02 |
| 2017/0127090 | A1* | 5/2017 | Rosewarne ............ H04N 19/86 |

FOREIGN PATENT DOCUMENTS

| | | |
|---|---|---|
| CN | 102857756 A | 1/2013 |
| CN | 103491372 A | 1/2014 |
| CN | 103841419 A | 6/2014 |
| CN | 103988511 A | 8/2014 |
| CN | 103999460 A | 8/2014 |
| WO | 2014/075552 A1 | 5/2014 |

OTHER PUBLICATIONS

An, J., et al.; "Non-CE7: Boundary-Dependent Transform for Inter-Prediction Residue;" Joint Collaborative Team on Video Coding (JCT-VC) of ITU-T SG16 WP3 and ISO/IEC JTC1/SC29/WG11; Nov. 2011; pp. 1-11.

Yeo, C., et al.; "Mode-Dependent Fast Separable KLT for Block-based Intra Coding;" Joint Collaborative Team on Video Coding (JCT-VC) of ITU-T SG16 WP3 and ISO/IEC JTC1/SC29/WG11; Jul. 2010; pp. 1-7.

Saxena, A., et al.; "Jointly optimal intra prediction and adaptive primary transform;" Joint Collaborative Team on Video Coding (JCT-VC) of ITU-T SG16 WP3 and ISO/IEC JTC1/SC29/WG11; Oct. 2010; pp. 1-21.

Saxena, A., et al.; "CE7: Mode-dependent DCT/DST without 4*4 full matrix multiplication for intra prediction;" Joint Collaborative Team on Video Coding (JCT-VC) of ITU-T SG16 WP3 and ISO/IEC JTC1/SC29/WG11; Mar. 2011; pp. 1-10.

* cited by examiner

METHOD AND APPARATUS OF ALTERNATIVE TRANSFORM FOR VIDEO CODING

CROSS REFERENCE TO RELATED APPLICATIONS

The present invention claims priority to U.S. Provisional Patent Application, Ser. No. 62/085,358, filed on Nov. 28, 2014. The U.S. Provisional Patent Application is hereby incorporated by reference in its entirety.

TECHNICAL FIELD

The present invention relates video coding. In particular, the present invention relates to using alternative transforms for Inter prediction coded blocks in video coding.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block. A CU may begin with a largest CU (LCU), which is also referred as coded tree unit (CTU) in HEVC and each CU can be recursively split into four smaller CUs until the pre-defined minimum size is reached. Once the splitting of CU hierarchical tree is done, each CU is further split into one or more prediction units (PUs) according to prediction type and PU partition. Each CU or the residual of each CU is divided into a tree of transform units (TUs) to apply 2D transforms such as DCT (discrete cosine transform) or DST (discrete sine transform).

Like many other precedent standards, HEVC adopts Discrete Cosine Transform type II (DCT-II) as its core transform because it has a strong "energy compaction" property. Most of the signal information tends to be concentrated in few low-frequency components of the DCT-II, which approximates the Karhunen-Loève Transform (KLT). As known in the art, KLT is the optimal transform to de-correlate signals that can be modelled by Markov processes. The N-point DCT-II of the signal f[n] is defined in equation (1).

$$\hat{f}_{DCT\text{-}II}[k] = \lambda_k \frac{2}{\sqrt{N}} \sum_{n=0}^{N-1} f[n]\cos\left[\frac{k\pi}{N}\left(n+\frac{1}{2}\right)\right], \quad (1)$$

$$k = 0, 1, 2, \ldots, N-1, \lambda_k = \begin{cases} 2^{-0.5}, & k=0 \\ 1, & k \neq 0 \end{cases}.$$

For Intra-predicted residue, there are other transforms that are found to be more efficient than DCT-II. In JCTVC-B024 (Yeo, et al., "*Mode Dependent Fast Separable KLT for Block-based Intra Coding*", Joint Collaborative Team on Video Coding (JCT-VC) of ITU-T SG16 WP3 and ISO/IEC JTC1/SC29/WG11, 2nd Meeting: Geneva, CH, 21-28 Jul. 2010, Document: JCTVC-B024), JCTVC-C108 (Saxena, et al., "*Jointly optimal intra prediction and adaptive primary transform*", Joint Collaborative Team on Video Coding (JCT-VC) of ITU-T SG16 WP3 and ISO/IEC JTC1/SC29/WG11, 3rd Meeting: Guangzhou, CN, 7-15 Oct. 2010, Document: JCTVC-C108) and JCTVC-E125 (Saxena, et al., "*CE7: Mode-dependent DCT/DST without 4\*4 full matrix multiplication for intra prediction*", Joint Collaborative Team on Video Coding (JCT-VC) of ITU-T SG16 WP3 and ISO/IEC JTC1/SC29/WG11, 5th Meeting: Geneva, CH, 16-23 Mar. 2011, Document: JCTVC-E125), Discrete Sine Transform (DST) was introduced as an alternative to DCT for oblique Intra modes. For Inter-predicted residue, DCT-II is the only transform used in the current HEVC. However, the DCT-II is not the optimal transform for all cases. In JCTVC-G281 (An, et al., "*Non-CE7: Boundary-Dependent Transform for Inter-Predicted Residue*", Joint Collaborative Team on Video Coding (JCT-VC) of ITU-T SG16 WP3 and ISO/IEC JTC1/SC29/WG11, Document: JCTVC-G281), the Discrete Sine Transform type VII (DST-VII) and Discrete Cosine Transform type IV (DCT-IV) are proposed to replace DCT-II in some cases. When using Inter prediction for a PU, the prediction error (i.e., prediction residue or residue) is usually larger near the PU boundaries than in the middle of the PU. FIG. 1 illustrates an example of the squared residue values for a 4×4 PU. As shown in FIG. 1, the residue (i.e., prediction error) tends to have larger squared values at the PU boundaries.

When a PU is split into multiple TUs as shown in FIG. 2, the prediction error is larger near PU boundaries than near interior TU (non-PU) boundaries. In FIG. 2, PU 210 is split into four TUs (i.e., TU0, TU1, TU2 and TU3). Block 220 corresponds to the squared residue values of the upper-left TU (i.e., TU0), where the residues near the PU boundaries (indicated by thick solid lines) are generally larger than the residues near the interior TU boundaries (indicated by dashed lines). For TU0, a trend can be observed that the squared residue values peak roughly around the upper-left corner and decrease toward the lower-right corner. Similarly, for other TUs, the squared residue values also peak roughly around the respective PU corners and decrease toward the center of the PU.

The reason of this effect may be due to the different motion vectors (MV) between two neighboring PUs. In order to handle this uneven error distribution, alternative transforms such as DST-VII and DCT-IV can be used. Equations (2) and (3) show the N-point DST-VII and DCT-IV of signal f[n], respectively.

$$\hat{f}_{DST\text{-}VII}[k] = \frac{2}{\sqrt{2N+1}} \sum_{n=0}^{N-1} f[n]\sin\frac{(2k+1)(n+1)\pi}{2N+1}, \quad (2)$$

$$k = 0, 1, \ldots, N-1,$$

$$\hat{f}_{DCT\text{-}IV}[k] = \frac{2}{\sqrt{N}} \sum_{n=0}^{N-1} f[n]\cos\left[\frac{\pi}{N}\left(k+\frac{1}{2}\right)\left(n+\frac{1}{2}\right)\right], \quad (3)$$

$$k = 0, 1, \ldots, N-1.$$

Based on the above observation, a method is disclosed in JCTVC-G281 that uses DST-VII or DCT-IV instead of DCT-II if one and only one of the two TU boundaries in the horizontal or vertical direction is a PU boundary. Table 1 shows the mapping from boundary type to transform type by using the DST-VII. Table 2 shows the mapping from boundary type to transform by using the DCT-IV.

TABLE 1

| TU Boundary Horizontal | | | TU Boundary Vertical | | |
|---|---|---|---|---|---|
| Left | Right | Trans. | Top | Bottom | Trans. |
| non-PU | PU | DST-VII | non-PU | PU | DST-VII |
| PU | non-PU | F(DST-VII) | PU | non-PU | F(DST-VII) |
| PU | PU | DCT-II | PU | PU | DCT-II |
| non-PU | non-PU | DCT-II | non-PU | non-PU | DCT-II |

TABLE 2

| TU Boundary | | Horizontal | TU Boundary | | Vertical |
|---|---|---|---|---|---|
| Left | Right | Trans. | Top | Bottom | Trans. |
| non-PU | PU | F(DCT-IV) | non-PU | PU | F(DCT-IV) |
| PU | non-PU | DCT-IV | PU | non-PU | DCT-IV |
| PU | PU | DCT-II | PU | PU | DCT-II |
| non-PU | non-PU | DCT-II | non-PU | non-PU | DCT-II |

The F(DST-VII) in Table 1 means flipping the DST matrix from left to right. The cases of using F(DST-VII) can also be implemented as flipping the input data first and then using DST-VII. It is also the case for F(DCT-IV). In Table 1 and Table 2, the items "non-PU" and "PU" mean non-PU boundary and PU boundary, respectively. In Table 1 and Table 2, when both of the TU boundaries in the horizontal or vertical direction are PU boundary or a non-PU boundary, DCT-II is used.

According to the Table 1, the four TUs in FIG. 2 will use transforms as shown in Table 3.

TABLE 3

| TU | Horizontal Trans. | Vertical Trans. |
|---|---|---|
| TU0 | F(DST-VII) | F(DST-VII) |
| TU1 | DST-VII | F(DST-VII) |
| TU2 | F(DST-VII) | DST-VII |
| TU3 | DST-VII | DST-VII |

The Boundary Dependent Transform (BDT) method disclosed in JCTVC-G281 may improve the overall performance of the coding system. However, due to the characteristics of individual TU or PU, the BDT method according to JCTVC-G281 may not always achieve the best performance for a given block. It is desirable to develop a method to further improve the performance.

SUMMARY

A method and apparatus for alternative transforms in a video coding system according to a control flag are disclosed. According to an embodiment of the present invention, control flag for the current PU is determined. If the control flag has a first value, a first transform is applied to each current TU (transform unit) at an encoder side or an inverse transform of the first transform is applied to each current TU at a decoder side if the current TU has a first boundary type. Furthermore, a second transform is applied to each current TU at the encoder side or an inverse transform of the second transform is applied to each current TU at the decoder side if the current TU has a second boundary type. The first transform is different from the second transform. On the other hand, if the control flag has a second value, a selected transform is applied to each current TU at the encoder side or an inverse transform of the selected transform is applied to each current TU at the decoder side regardless of boundary type of the current TU.

In one embodiment, the control flag can be signaled at a TU, PU or CU (coding unit) level. In another embodiment, the control flag can be explicitly signaled only for the current PU, TU or CU having first sizes. In yet another embodiment, the control flag can be explicitly signaled depending on other flag in a sequence, picture or slice header level.

In one embodiment, the control flag is implicitly determined based on the boundary type of the current PU, and the first transform, the second transform, the selected transform or a combination thereof is determined depending on another flag being explicitly signaled.

In one embodiment, the second transform corresponds to a flipped version of the first transform. The first transform may correspond to discrete sine transform type V-II (DST-VII) or discrete cosine transform type IV (DCT-IV). The first boundary type may include a left PU boundary plus a right non-PU boundary and a top non-PU boundary plus a bottom PU boundary, and the second boundary type includes a left non-PU boundary plus a right PU boundary and a top PU boundary plus a bottom non-PU boundary. Furthermore, the first boundary type may further include the left PU boundary plus the right PU boundary, the left non-PU boundary plus the right non-PU boundary, the top PU boundary plus the bottom PU boundary and the top non-PU boundary plus the bottom non-PU boundary.

The first transform, the second transform, the selected transform or a combination thereof may be dependent on block size of the current PU. For example, the first transform may correspond to DST-VII (discrete sine transform type V-II) if the block size of the current PU is 4×4, and the first transform may correspond to DCT-IV (discrete cosine transform type IV) if the block size of the current PU is 8×8 or 16×16. The selected transform may correspond to discrete cosine transform type II (DCT-II).

In another aspect, a method and apparatus for alternative transforms in a video coding system according to a control flag are disclosed. According to an embodiment of the present invention, control flag for the current PU is determined. If the control flag has a first value, a first transform is applied to each current TU (transform unit) at an encoder side or an inverse transform of the first transform is applied to each current TU at a decoder side if the current TU belongs to a first type. Furthermore, a second transform is applied to each current TU at the encoder side or an inverse transform of the second transform is applied to each current TU at the decoder side if the current TU belongs to a second type. The first transform is different from the second transform. On the other hand, if the control flag has a second value, a selected transform is applied to each current TU at the encoder side or an inverse transform of the selected transform is applied to each current TU at the decoder side regardless of boundary type of the current TU. In one embodiment, whether the current TU belongs to the first type or the second type is determined according to a boundary type, block size, mode information, or a combination thereof.

DETAILED DESCRIPTION

Figure 1:
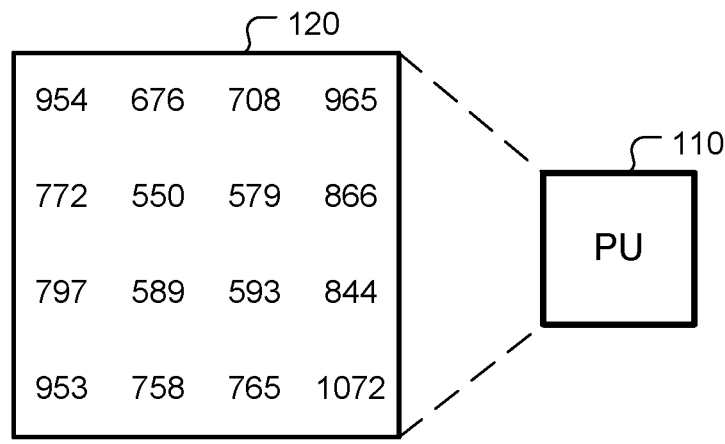
FIG. 1 illustrates an example of the squared residue values for a 4×4 PU.
Figure 2:
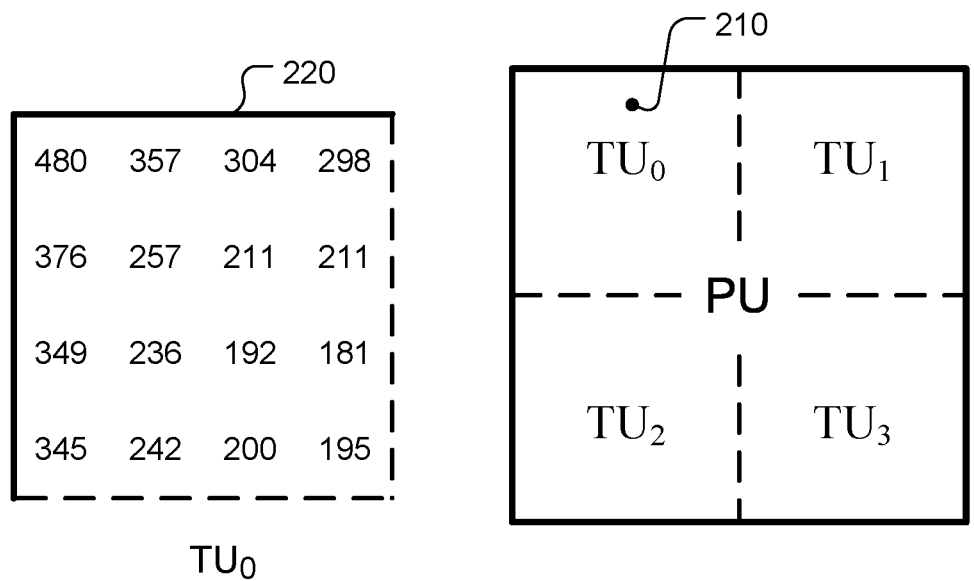
FIG. 2 illustrates an example that the prediction error is larger near PU (prediction unit) boundaries than near interior TU (non-PU) boundaries, where the PU is partitioned into four TUs (transform units).

The following description is of the best-contemplated mode of carrying out the invention. This description is made for the purpose of illustrating the general principles of the invention and should not be taken in a limiting sense. The scope of the invention is best determined by reference to the appended claims.

As mentioned before, it is observed that the Inter prediction error is larger near the PU boundaries than that in the middle of the PU. Accordingly, a Boundary Dependent Transform (BDT) method is disclosed in JCTVC-G281 to adapt this uneven error distribution in a single PU. The BDT method selects transform according to the boundary type (i.e., non-PU boundary or PU boundary), which is summarized in Table 1 and Table 2.

However, for a given boundary type, the BDT method always applies a fixed-type transform to the block such as DST-VII or DCT-II. However, the characteristics of prediction residues may be quite different from block to block. The BDT method may not always achieve the best performance. Accordingly, the present invention discloses a method to use a control flag to control the BDT operation in order to further improve the performance of BDT. With the explicit control flag, an encoder can decide whether to turn on or off the BDT using mode decision methods such as Rate Distortion Optimization (RDO). The encoder then signals the control flag to inform decoder. For example, the control flag may be signaled in a TU, PU or CU level. In one example, the control flag is signaled only for the current PU, TU or CU having a specific size. However, the control flag may also be determined implicitly. For example, the value of the control flag may be dependent on the block size so that the boundary dependent transform is on for some block sizes and off for other block sizes. Alternatively, the value of the control flag may be dependent on mode information so that the boundary dependent transform is on for some prediction modes and off for other prediction modes. Furthermore, the control flag can be explicitly signaled depending on other flag in the sequence, picture or slice header level. For example, the other flag may correspond to present_flag in a sequence level. If present_flag is 1, the control flag exists. If present_flag is 0, the control flag does not exist and its value is inferred to 0. When the control flag is implicitly determined, another explicit flag can be signaled to select transform for the TUs associated with the PU.

The explicit control flag can be used as follows. If the control flag is equal to 0, original DCT in HEVC will be used for the TU. If the control flag is equal to 1, BDT will be used for the TU.

In another example, the explicit control flag can be used as follow. If the control flag is equal to 0, original DCT in HEVC will be used for the TU. If the control flag is equal to 1, the BDT will be used for the TU. However, the BDT is modified from that in JCTVC-G281 so that the modified BDT only follows the decision regarding whether to use the flipped or non-flipped version of the transform (T). The modified BDT may use a transform different from the original BDT for each boundary type. Table 4 illustrates an example of transform selection for each boundary type. The transform selection may be based on the block size of the current transform unit (or current prediction unit). For example, DST-VII is used for 4-point and DCT-IV for 8-point and 16-point, respectively. In Table 4, Flip-T denotes a transform using flipped transform matrix of T. In another example, the transform selection may be based on the mode information of the current prediction unit.

In the above examples, specific transforms such as DST-VII and DCT-IV are used as exemplary transforms to practice the present invention. However, the present invention is not limited to the specific transforms used. The control flag can be used to control the use of boundary dependent transform regardless the transforms used.

In another embodiment, the control flag may be determined implicitly based on the boundary type, block size or motion information of the current block, and the transform selection is further determined depending on another flag being explicitly signaled. For example, a current transform type is implicitly determined for the current block by selecting from a first transform type or an explicitly signaling type based on block boundary type, block size, or mode information. If the explicitly signaling type is selected, the current transform type is further determined by an explicitly signaled flag.

Figure 3:
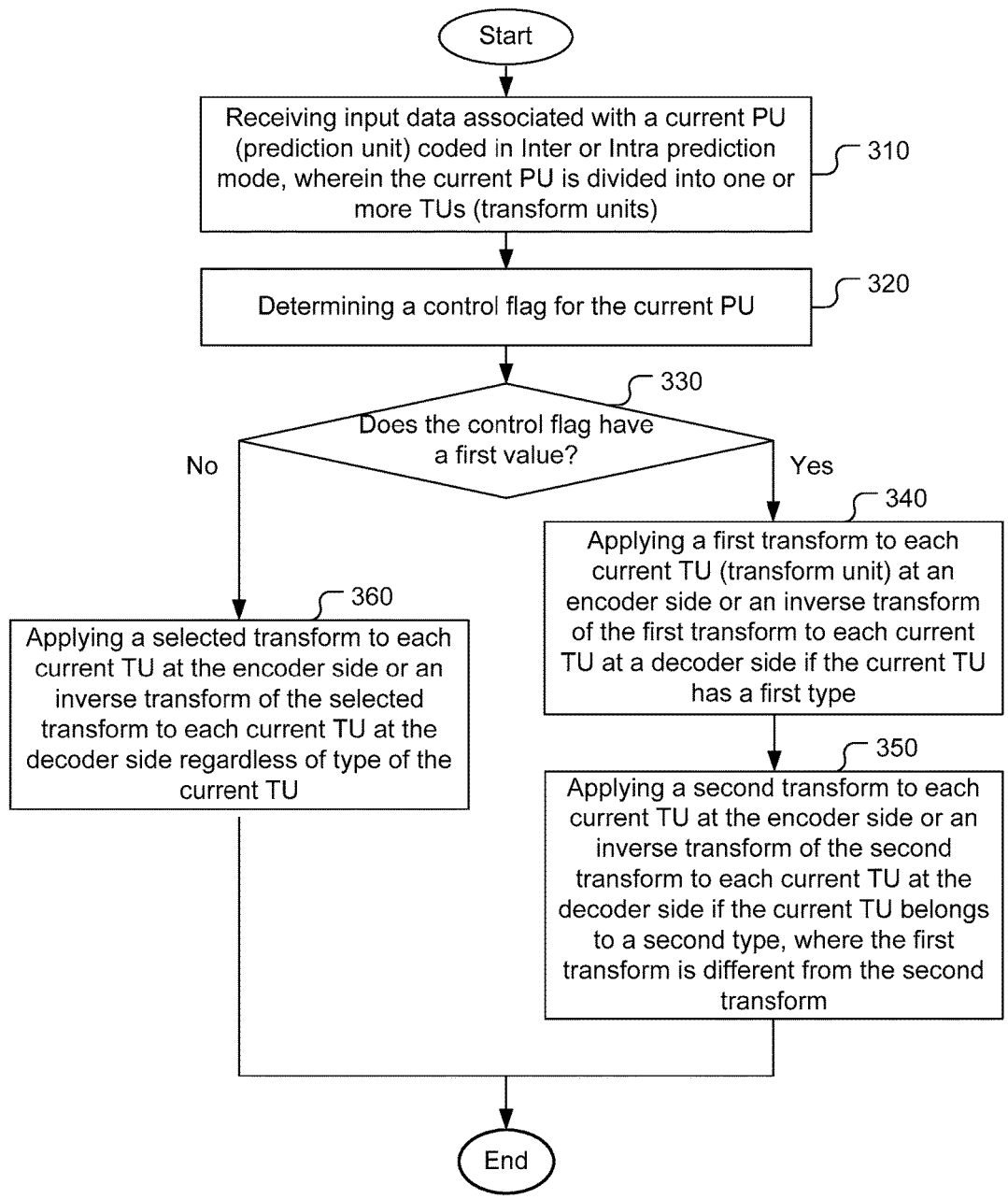
FIG. 3 illustrates an exemplary flowchart of a coding system incorporating block characteristics-dependent transform based on a control flag according to an embodiment of the present invention.

FIG. 3 illustrates an exemplary flowchart of a coding system incorporating block characteristics-dependent transform based on a control flag according to an embodiment of the present invention. The system receives input data associated with a current PU (prediction unit) coded in Inter or Intra prediction mode, wherein the current PU is divided into one or more TUs (transform units) in step 310. The input data may correspond to residues of the current PU to be coded at the encoder side or the coded residues of the current PU in the decoder side. The current PU may be retrieved from storage such as a computer memory of buffer (RAM or DRAM). The video bitstream may also be received from a processor such as a processing unit or a digital signal. A control flag for the current PU is determined in step 320. Whether the control flag has a first value (e.g., is on) is tested in step 330. If the result is "yes", steps 340 and 350 are performed. If the result is "No", step 360 is performed. In step 340, a first transform is applied to each current TU (transform unit) at an encoder side or an inverse transform of the first transform to each current TU at a decoder side if the current TU belongs to a first type (i.e., the block characteristic thereof belongs to the first type). In step 350, a second transform is applied to each current TU at the encoder side or an inverse transform of the second transform to each current TU at the decoder side if the current TU belongs to a second type (i.e., the block characteristic thereof belongs to the second type), where the first transform is different from the second transform. In one embodiment, whether the current TU belongs to the first type or the second type is associated with a boundary type of the current TU. In another embodiment, whether the current TU belongs to the first type or the second type is determined according to a boundary type (e.g., a PU boundary or a non-PU boundary), block size (e.g., larger than a predetermined size or not), mode information (e.g., information related to a specific prediction mode), or a combination thereof. In step 360, a selected transform is applied to each current TU at the encoder side or an inverse transform of the selected transform to each current TU at the decoder side regardless of type of the current TU.

The flowchart shown above is intended to illustrate examples of Intra prediction filtering according an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodi-

TABLE 4

| TU Boundary | | Horizontal Trans. | TU Boundary | | Vertical Trans. |
|---|---|---|---|---|---|
| Left | Right | | Top | Bottom | |
| non-PU | PU | Flip-T | non-PU | PU | Flip-T |
| PU | non-PU | T | PU | non-PU | T |
| PU | PU | T | PU | PU | T |
| non-PU | non-PU | T | non-PU | non-PU | T | ments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of alternative transforms for video coding, the method comprising:
   receiving input data associated with a current PU (prediction unit) coded in Inter or Intra prediction mode, wherein the current PU is divided into one or more current TUs (transform units);
   determining a control flag for the current PU;
   when the control flag has a first value:
   applying a first transform to each current TU (transform unit) at an encoder side or an inverse transform of the first transform to each current TU at a decoder side if the current TU has a first boundary type; and
   applying a second transform to each current TU at the encoder side or an inverse transform of the second transform to each current TU at the decoder side if the current TU has a second boundary type; wherein the first transform is different from the second transform; and
   when the control flag has a second value:
   applying a selected transform to each current TU at the encoder side or an inverse transform of the selected transform to each current TU at the decoder side regardless of boundary type of the current TU.

2. The method of claim 1, wherein the control flag is signaled at a TU, PU or CU (coding unit) level.

3. The method of claim 1, wherein the control flag is explicitly signaled only for the current PU, the current TU or current CU (coding unit) having first sizes.

4. The method of claim 1, wherein the control flag is explicitly signaled depending on other flag in sequence, picture or slice header level.

5. The method of claim 1, wherein the second transform corresponds to a flipped version of the first transform.

6. The method of claim 5, wherein the first transform corresponds to discrete sine transform type V-II (DST-VII) or discrete cosine transform type IV (DCT-IV).

7. The method of claim 6, wherein the first boundary type includes a left PU boundary plus a right non-PU boundary and a top non-PU boundary plus a bottom PU boundary, and the second boundary type includes a left non-PU boundary plus a right PU boundary and a top PU boundary plus a bottom non-PU boundary.

8. The method of claim 7, wherein the first boundary type further includes the left PU boundary plus the right PU boundary, the left non-PU boundary plus the right non-PU boundary, the top PU boundary plus the bottom PU boundary and the top non-PU boundary plus the bottom non-PU boundary.

9. The method of claim 1, wherein the first boundary type includes a left PU boundary plus a right non-PU boundary and a top non-PU boundary plus a bottom PU boundary, and the second boundary type includes a left non-PU boundary plus a right PU boundary and a top PU boundary plus a bottom non-PU boundary.

10. The method of claim 9, wherein the first boundary type further includes the left PU boundary plus the right PU boundary, the left non-PU boundary plus the right non-PU boundary, the top PU boundary plus the bottom PU boundary and the top non-PU boundary plus the bottom non-PU boundary.

11. The method of claim 1, wherein the control flag is explicitly signaled and the first transform, the second transform, the selected transform or a combination thereof is further dependent on block size or mode information of the current PU.

12. The method of claim 11, wherein the first transform corresponds to DST-VII (discrete sine transform type V-II) if the block size of the current PU is 4×4, and the first transform corresponds to DCT-IV (discrete cosine transform type IV) if the block size of the current PU is 8×8 or 16×16.

13. The method of claim 1, wherein the control flag is implicitly determined based on the boundary type of the current PU, and the first transform, the second transform, the selected transform or a combination thereof is determined depending on another flag being explicitly signaled.

14. The method of claim 1, wherein the selected transform corresponds to discrete cosine transform type II (DCT-II).

15. An apparatus for alternative transforms in a video coding system, the apparatus comprising one or more electronic circuits configured to:
   receive input data associated with a current PU (prediction unit) coded in Inter prediction mode, wherein the current PU is divided into one or more current TUs (transform units);
   determine a control flag for the current PU;
   when the control flag has a first value:
   apply a first transform to each current TU (transform unit) at an encoder side or an inverse transform of the first transform to each current TU at a decoder side if the current TU has a first boundary type; and apply a second transform to each current TU at the encoder side or an inverse transform of the second transform to each current TU at the decoder side if the current TU has a second boundary type; wherein the first transform is different from the second transform; and when the control flag has a second value:

apply a selected transform to each current TU at the encoder side or an inverse transform of the selected transform to each current TU at the decoder side regardless of boundary type of the current TU.

16. A method of alternative transforms for video coding, the method comprising:

receiving input data associated with a current PU (prediction unit) coded in Inter or Intra prediction mode, wherein the current PU is divided into one or more current TUs (transform units);

determining a control flag for the current PU;

when the control flag has a first value:

applying a first transform to each current TU (transform unit) at an encoder side or an inverse transform of the first transform to each current TU at a decoder side if the current TU belongs to a first type; and applying a second transform to each current TU at the encoder side or an inverse transform of the second transform to each current TU at the decoder side if the current TU belongs to a second type; wherein the first transform is different from the second transform; and when the control flag has a second value:

applying a selected transform to each current TU at the encoder side or an inverse transform of the selected transform to each current TU at the decoder side regardless of type of the current TU.

17. The method of claim 16, wherein further comprising determining the current TU belongs to the first type or the second type according to a boundary type, block size, mode information, or a combination thereof.

18. An apparatus for alternative transforms in a video coding system, the apparatus comprising one or more electronic circuits configured to:

receive input data associated with a current PU (prediction unit) coded in Inter or Intra prediction mode, wherein the current PU is divided into one or more current TUs (transform units);

determine a control flag for the current PU;

when the control flag has a first value:

apply a first transform to each current TU (transform unit) at an encoder side or an inverse transform of the first transform to each current TU at a decoder side if the current TU belongs to a first type; and apply a second transform to each current TU at the encoder side or an inverse transform of the second transform to each current TU at the decoder side if the current TU belongs to a second type; wherein the first transform is different from the second transform; and when the control flag has a second value:

apply a selected transform to each current TU at the encoder side or an inverse transform of the selected transform to each current TU at the decoder side regardless of type of the current TU.

* * * * *